US012130001B1

(12) United States Patent
Wang et al.

(10) Patent No.: US 12,130,001 B1
(45) Date of Patent: Oct. 29, 2024

(54) LIGHTING DEVICE HAVING ANTI-GLARE LIGHT COVER

(71) Applicant: Xiamen PVTECH Co., Ltd., Fujian (CN)

(72) Inventors: Sijia Wang, Fujian (CN); Liangliang Cao, Fujian (CN); Fuxing Lu, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/525,862

(22) Filed: Dec. 1, 2023

(30) Foreign Application Priority Data

Apr. 25, 2023 (CN) ......................... 202310455583.6

(51) Int. Cl.
*F21V 3/02* (2006.01)
*F21S 2/00* (2016.01)

(52) U.S. Cl.
CPC ................ *F21V 3/02* (2013.01); *F21S 2/005* (2013.01)

(58) Field of Classification Search
CPC ...... F21Y 2115/30; F21L 4/005; F21V 15/01; F21V 5/08; F21V 5/02; F21V 5/008; F21V 3/049
See application file for complete search history.

(56) References Cited

FOREIGN PATENT DOCUMENTS

| | | | | | |
|---|---|---|---|---|---|
| CN | 102829394 | A | | 12/2012 | |
| CN | 211146383 | U | | 7/2020 | |
| CN | 113294751 | A | * | 8/2021 | |
| CN | 115949893 | A | | 4/2023 | |
| CN | 116753477 | A | * | 9/2023 | |
| EP | 3653927 | A2 | * | 5/2020 | ............ F21V 19/004 |
| EP | 4170233 | A1 | * | 4/2023 | ............ F21V 17/164 |

OTHER PUBLICATIONS

Innovation Q+ NPL Search (Year: 2024).*

* cited by examiner

*Primary Examiner* — Anabel Ton
(74) *Attorney, Agent, or Firm* — Winston Hsu

(57) ABSTRACT

A lighting device having anti-glare light cover includes a plurality of light-emitting modules. Each light-emitting module include a main body, a light source board and a light cover. The main body has an installation portion. The light source board is disposed on the installation portion. The light cover is disposed on the main body to form an accommodating space between the main body and the light cover. The light source board is disposed in the accommodating space. The light cover includes a left vertical portion, a right vertical portion, a left sawteeth portion, a right sawteeth portion and a central portion. The left and right vertical portions are connected to the main body. The left and right sawteeth portions are connected to the left vertical portion and the right vertical portion respectively. The central portion are connected to the left sawteeth portion and the right sawteeth portion.

6 Claims, 11 Drawing Sheets

LIGHTING DEVICE HAVING ANTI-GLARE LIGHT COVER

BACKGROUND OF THE INVENTION

1. Field of the Invention

The present invention relates to a lighting device, in particular to a lighting device having anti-glare light cover.

2. Description of the Prior Art

Due to the advancement of technology, people's requirements for lighting devices are getting higher. Therefore, various lighting devices have been developed so as to meet the requirements of different applications. These lighting devices are used in various places, such as homes, stores, factories and mines. Different places have different lighting requirements, among which places such as factories and mines need more efficient lighting devices. These lighting devices need to provide high brightness and specific lighting range. However, currently available lighting devices cannot adjust the irradiation direction and lighting range, and can only increase the power to increase the brightness. Therefore, the currently available lighting devices will produce severe glare, which will make the user feel uncomfortable. Thus, the application of the currently available lighting devices is greatly limited and cannot meet actual requirements. For the same reason, the power consumption of the currently available lighting devices cannot be effectively reduced, so cannot meet the energy-saving requirements. Therefore, the currently available lighting devices are unable to meet the future development trend. China Patent Publication No. CN111396769, China Patent Publication No. CN209248059U and US Patent Publication No. US20160334079 disclose structural designs of lighting devices, but these lighting devices still cannot effectively solve the above-mentioned problems in the prior art.

SUMMARY OF THE INVENTION

One embodiment of the present invention provided a lighting device having anti-glare light cover. The lighting device includes a plurality of light-emitting modules and each of the light-emitting modules includes a main body, a light source board and a light cover. The main body has an installation portion. The light source board is disposed on the installation portion. The light cover is disposed on the main body to form an accommodating space between the main body and the light cover. The light source board is disposed in the accommodating space. The light cover includes a left vertical portion, a right vertical portion, a left sawteeth portion, a right sawteeth portion and a central portion. The left vertical portion and the right vertical portion are connected to the main body. The left sawteeth portion and the right sawteeth portion are connected to the left vertical portion and the right vertical portion respectively. The central portion are connected to the left sawteeth portion and the right sawteeth portion.

In one embodiment, the left vertical portion and the right vertical portion are perpendicular to a horizontal reference line parallel to the central portion. There an included angle between the left sawteeth portion and the horizontal reference line. There is another included angle between the right sawteeth portion and the horizontal reference line.

In one embodiment, the left sawteeth portion has a plurality of left sawteeth connected to each other.

In one embodiment, the included angles between the horizontal reference line and the normal lines of bottom sides of the left sawteeth increase in the direction toward the central portion.

In one embodiment, the top of each of the left sawteeth has a left sawtooth curved surface. The radian measures corresponding to the left sawtooth curved surfaces of the left sawteeth increase in the direction toward the central portion.

In one embodiment, the right sawteeth portion has a plurality of right sawteeth connected to each other.

In one embodiment, the included angles between the horizontal reference line and the normal lines of bottom sides of the right sawteeth increase in the direction toward the central portion.

In one embodiment, the top of each of the right sawteeth has a right sawtooth curved surface. The radian measures corresponding to the right sawtooth curved surfaces of the right sawteeth increase in the direction toward the central portion.

In one embodiment, the central portion has a plane portion, a left curved portion and a right curved portion. The plane portion is disposed between the left curved portion and the right curved portion.

In one embodiment, the installation portion has a recess and the light source board is disposed in the recess.

The lighting device having anti-glare light cover in accordance with the embodiments of the present invention may have the following advantages:

(1) In one embodiment of the present invention, the light cover of the lighting device includes a left vertical portion, a right vertical portion, a left sawteeth portion, a right sawteeth portion and a central portion, which can form a special and effective anti-glare structure, such that the included angle between the lighting range of the lighting device and the ceiling (parallel to the horizontal reference plane) is greater than or equal to 30°. Accordingly, the above anti-glare structure can effectively eliminate glare of the light emitted by the lighting device and can increase the brightness of the lighting range of the lighting device, so the user will not feel uncomfortable. Thus, the performance of the lighting device can be greatly enhanced, so the lighting device can be more comprehensive in application.

(2) In one embodiment of the present invention, the light cover of the lighting device includes the left vertical portion, the right vertical portion, the left sawteeth portion, the right sawteeth portion and the central portion, which can form the special and effective anti-glare structure. This anti-glare structure can effectively eliminate glare of the light emitted by the lighting device and can increase the brightness of the lighting range of the lighting device. Therefore, the lighting device can be applicable to factories, mines or other similar working places, so the lighting device can meet actual requirements.

(3) In one embodiment of the present invention, the light cover of the lighting device includes the left vertical portion, the right vertical portion, the left sawteeth portion, the right sawteeth portion and the central portion, which can form the special and effective anti-glare structure. This anti-glare structure can effectively increase the brightness of the lighting range of the lighting device. In this way, the power consumption of the lighting device can be effectively reduced, so the lighting device can save more energy. Thus, the lighting device can conform to the future development trend.

(4) In one embodiment of the present invention, the light cover of the lighting device includes the left vertical portion, the right vertical portion, the left sawteeth portion, the right sawteeth portion and the central portion. In addition, the central portion has a plane portion, a left curved portion and a right curved portion. Accordingly, the light cover of the lighting device has a special optical structure, which can make the light emitted by the lighting device be uniform and soft. As a result, the light emitted by the lighting device can make the user feel more comfortable in order to meet the requirements of different applications.

(5) In one embodiment of the present invention, the light cover of the lighting device has the special optical structure design and the effective anti-glare structure, which can not only effectively eliminate glare of the light emitted by the lighting device, but also can prevent from light spot. Thus, the lighting device can provide a great user experience.

(6) In one embodiment of the present invention, the lighting device has an irradiation direction adjustment mechanism, so the irradiation direction of the lighting device can be adjusted according to actual requirements. Therefore, the lighting device can be more convenient in use and more flexible in application.

(7) In one embodiment of the present invention, the design of the lighting device is simple, so the lighting device can achieve great technical effects without significantly increasing the cost thereof.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
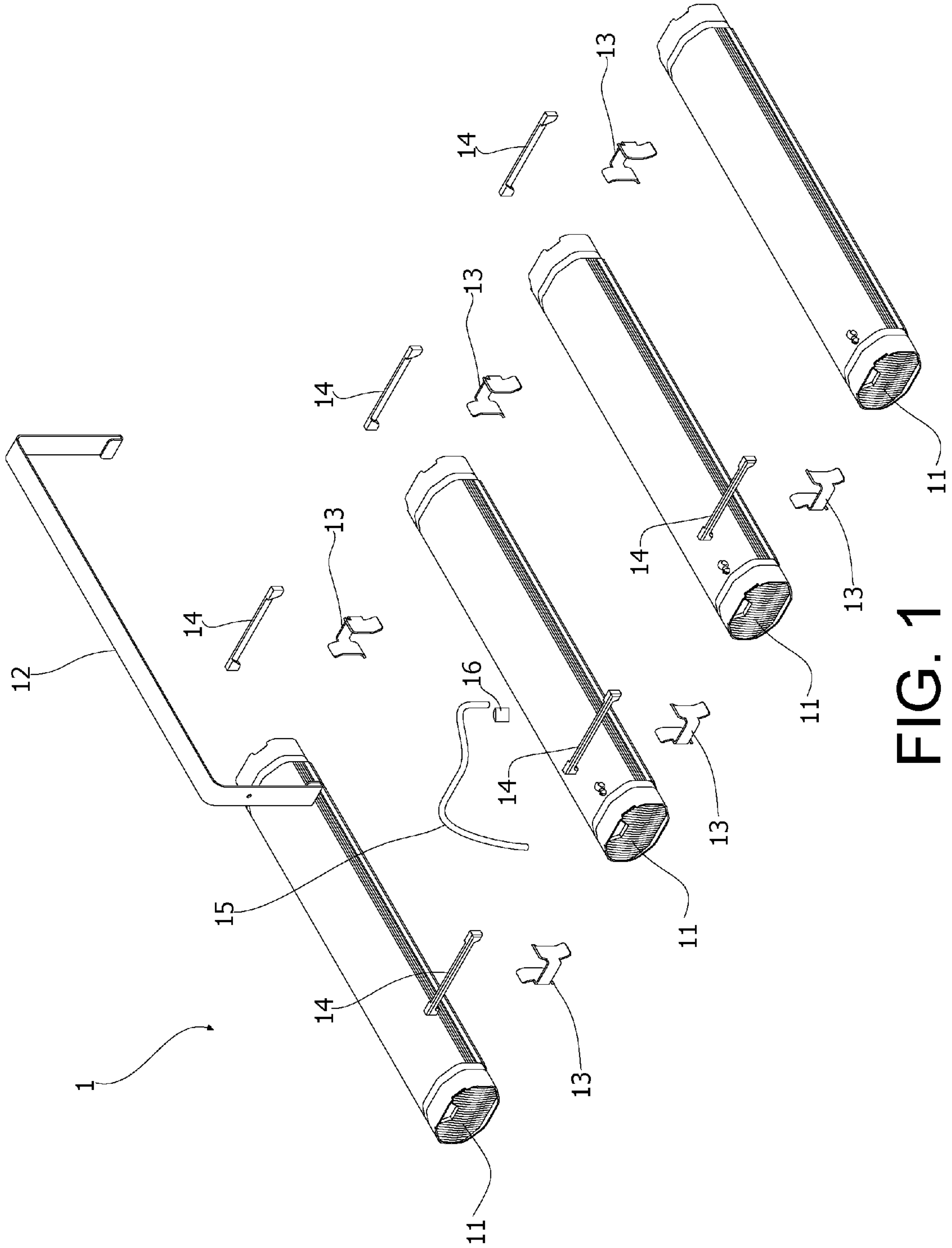
FIG. 1 is the exploded view of the lighting device having anti-glare light cover in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is “coupled” or “connected” to another element, the element may be “directly coupled” or “directly connected” to the other element or “coupled” or “connected” to the other element through a third element. In contrast, it should be understood that, when it is described that an element is “directly coupled” or “directly connected” to another element, there are no intervening elements.

Figure 2:
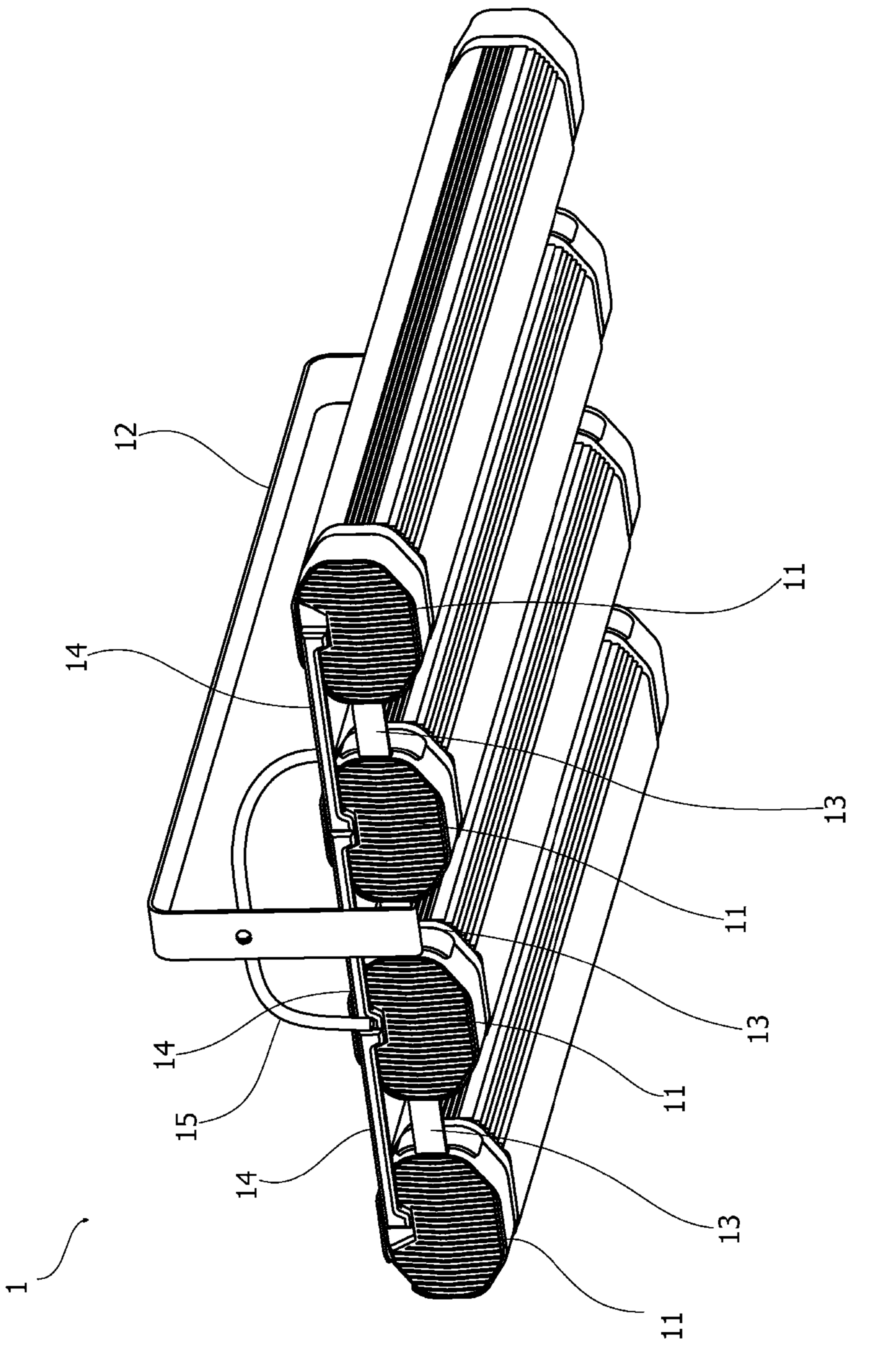
FIG. 2 is the perspective view of the lighting device having anti-glare light cover in accordance with one embodiment of the present invention.

Please refer to FIG. 1 and FIG. 2. FIG. 1 is the exploded view of the lighting device having anti-glare light cover in accordance with one embodiment of the present invention. FIG. 2 is the perspective view of the lighting device having anti-glare light cover in accordance with one embodiment of the present invention. The lighting device 1 may be a portable or mobile lighting device, such as a flashlight, a portable searchlight, a lighting equipment installed on a movable carrier, etc. The lighting device 1 may be a lamp fixed on the wall or the ceiling of a building. As shown in FIG. 1 and FIG. 2, the lighting device 1 includes four light-emitting modules 11, a hanging frame 12, a plurality of connecting elements 13, a plurality of connecting wires 14, a power cable 15 and a water-proof connector 16.

The light-emitting modules 11 are connected to each other via the connecting elements 13. The two sides of one of the connecting elements 13 can be fixed at one end of one of the light-emitting modules 11 and one end of another of the light-emitting modules 11 respectively. The two sides of another of the connecting elements 13 can be fixed at the other end of one of the light-emitting modules 11 and the other end of another of the light-emitting modules 11 respectively. In this way, the two light-emitting modules 11 adjacent to each other can be fixed with each other. In one embodiment, the connecting elements 13 may be made of a metal material, a plastic material or other similar materials.

The light-emitting modules 11 are electrically connected to each other via the above connecting wires 14, so the light-emitting modules 11 can be electrically connected to an external power source (not shown in the drawings) via the power cable 15. In this way, the external power source can drive the light-emitting modules 11. In one embodiment, the external power source may be a utility power, a power generator or other similar devices.

The hanging frame 12 can be fixed at two of the connecting wires 14. The hanging frame 12 can be fixed on the wall or the ceiling of a building in order to support the light-emitting modules 11.

The embodiment just exemplifies the present invention and is not intended to limit the scope of the present invention; any equivalent modification and variation according to the spirit of the present invention is to be also included within the scope of the following claims and their equivalents.

Figure 3:
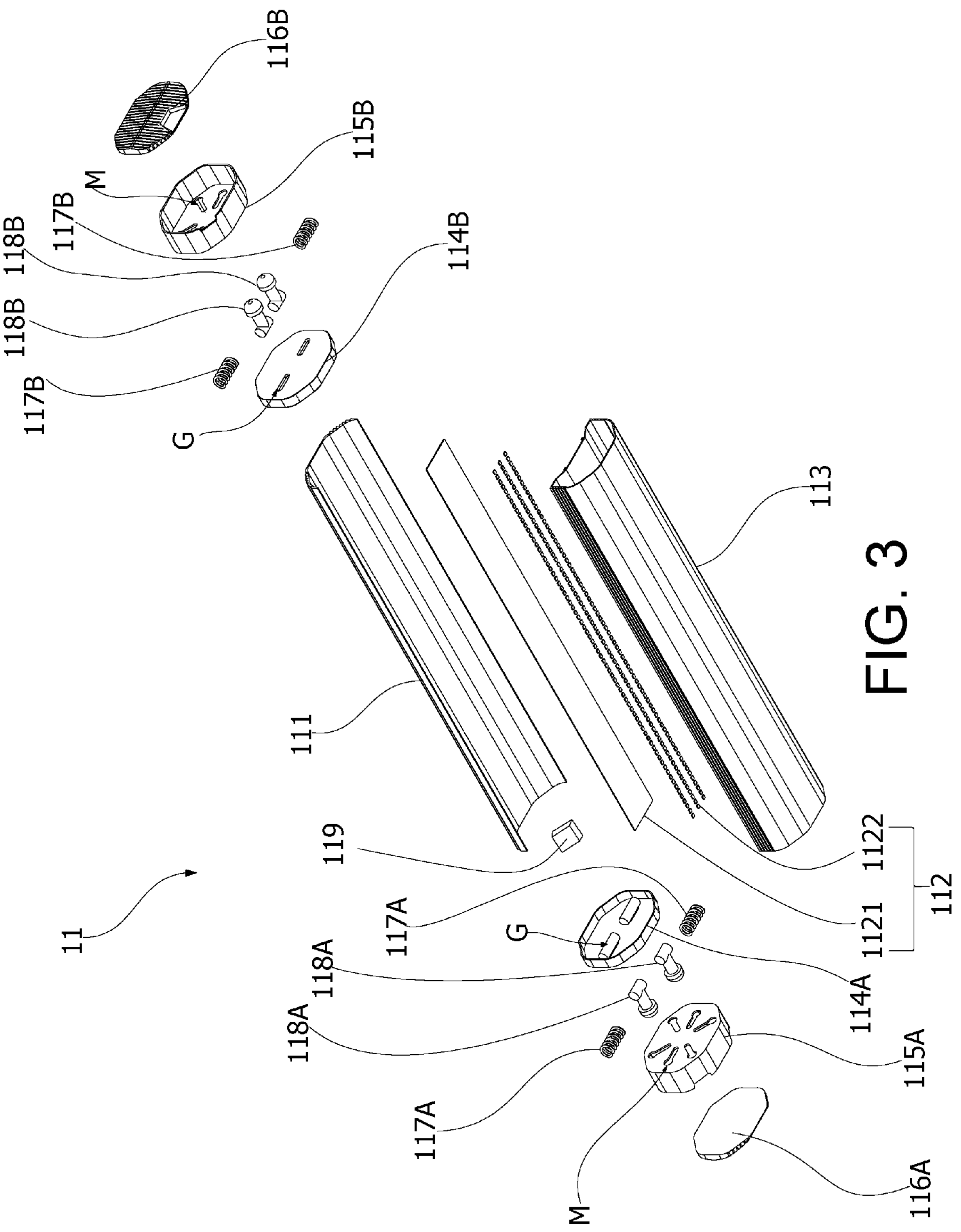
FIG. 3 is the exploded view of the light-emitting module of the lighting device having anti-glare light cover in accordance with one embodiment of the present invention.
Figure 4:
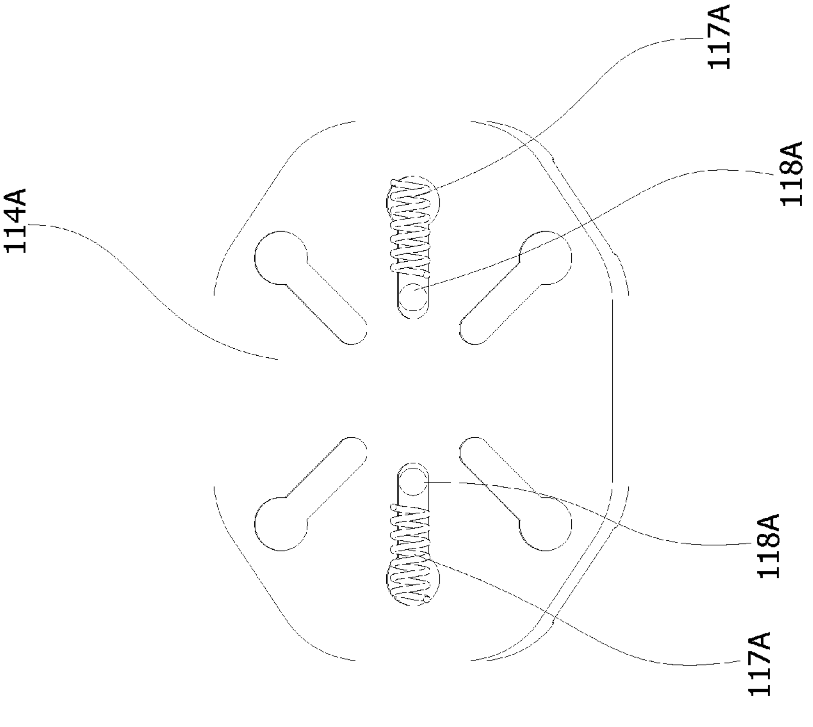
FIG. 4 is the top view of the left end cap of the lighting device having anti-glare light cover in accordance with one embodiment of the present invention.
Figure 5:
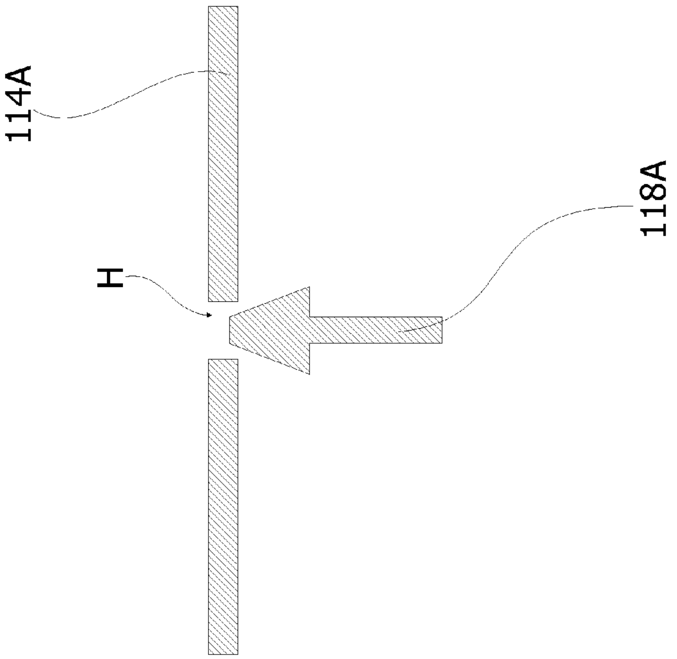
FIG. 5 is the side view of the left end cap of the lighting device having anti-glare light cover in accordance with one embodiment of the present invention.

Please refer to FIG. 3, FIG. 4 and FIG. 5. FIG. 3 is the exploded view of the light-emitting module of the lighting device having anti-glare light cover in accordance with one embodiment of the present invention. FIG. 4 and FIG. 5 is the top view and the side view of the left end cap of the lighting device having anti-glare light cover in accordance with one embodiment of the present invention respectively. As shown in FIG. 3, FIG. 4 and FIG. 5, the light-emitting module 11 includes a main body 111, a light source board 112, a light cover 113, a left end cap 114A, a right end cap 114B, a left connecting portion 115A, a right connecting portion 115B, a left decoration cover 116A, a right decoration cover 116B, a plurality of left springs 117A, a plurality of right springs 117B, a plurality of left fixing pins 118A, a plurality of right fixing pins 118B and a power source module 119. The main body 11 has an internal space and the power source module 119 is disposed in the internal space. In one embodiment, the main body 111 may be made of a metal material (e.g., aluminum, copper, stainless steel, etc.), a plastic material or other similar materials. In one embodiment, the power source module 119 may be a light-emitting diode (LED) driver or other currently available light source drivers.

The light source board 112 is disposed on one side of the main body 111, and includes a circuit board 1121 and a plurality of light sources 1122. The light source board 112 is electrically connected to the power source module 119, and the power source module 119 is electrically connected to the external power source via the connecting wires 14 and the power cable 15. The light sources 1122 are disposed on one side of the circuit board 1121. The circuit board 1121 further includes other necessary electronic components. In one embodiment, the light sources 1122 may be LEDs. In another embodiment, the light sources 1122 may be fluorescent lamps, bulbs or other currently available light sources.

The light cover 113 is disposed on one side of the main body 111 in order to cover the light source board 112. In one embodiment, the light cover 113 may be made of a transparent material or a semitransparent material, such as glass, plastics, etc.

The left end cap 114A is disposed at one end of the main body 111 and has a plurality of slots G. Each slot G can contain one left spring 117A and one left fixing pin 118A. The left end cap 114A is connected to the left fixing pin 117A and the main body 111 via the left springs 117A. When the left fixing pins 118A contact the left end cap 114A, the left fixing pins 118A move toward the direction away from the center of the left end cap 114A. When any one of the left fixing pins 118A reaches the circular hole H, the left fixing pin 118A is inserted into the circular hole H. Then, the left fixing pin 118 can fix the main body 111 with the left end cap 114A due to the elastic force of the left spring 117A corresponding to the left fixing pin 118A. In one embodiment, the left fixing pins 118A may be made of a metal material, a plastic material or other similar materials.

The left connecting portion 115A is disposed on the left end cap 114A. The left connecting portion 115A is provided with three adjusting grooves M corresponding to different angles respectively. In one embodiment, the left connecting portion 115A may be made of a metal material, a plastic material or other similar materials.

The left decoration cover 116A is disposed on the left connecting portion 115A in order to cover the inner space of the left connecting portion 115A. The surface of the left decoration cover 116A may has a special texture so as to improve the overall visual effect of the light-emitting module 11. In one embodiment, the left decoration cover 116A may be made of a metal material, a plastic material or other similar materials.

The right end cap 114B is disposed at the other end of the main body 111 and also has several slots G. Each slot G can contain one right spring 117B and one right fixing pin 118B. The right end cap 114B is connected to the right fixing pin 117B and the main body 111 via the right springs 117B. The main body 111 and the right end cap 114B are fixed with each other by the same way, so will not be described herein again. In one embodiment, the right fixing pin 118B may be made of a metal material, a plastic material or other similar materials.

The right connecting portion 115B is disposed on the right end cap 114B. The right connecting portion 115B is also provided with three adjusting grooves M corresponding to different angles respectively. The structure of the right connecting portion 115B is corresponding to that of the left connecting portion 115A. In one embodiment, the right connecting portion 115B may be made of a metal material, a plastic material or other similar materials. The above adjusting grooves M can be used to adjust the irradiation direction of the light-emitting module 11.

The right decoration cover 116B is disposed on the right connecting portion 115B in order to cover the inner space of the right connecting portion 115B. The surface of the right decoration cover 116B may has a special texture so as to improve the overall visual effect of the light-emitting module 11. In one embodiment, the right decoration cover 116B may be made of a metal material, a plastic material or other similar materials.

The embodiment just exemplifies the present invention and is not intended to limit the scope of the present invention; any equivalent modification and variation according to the spirit of the present invention is to be also included within the scope of the following claims and their equivalents.

Figure 6:
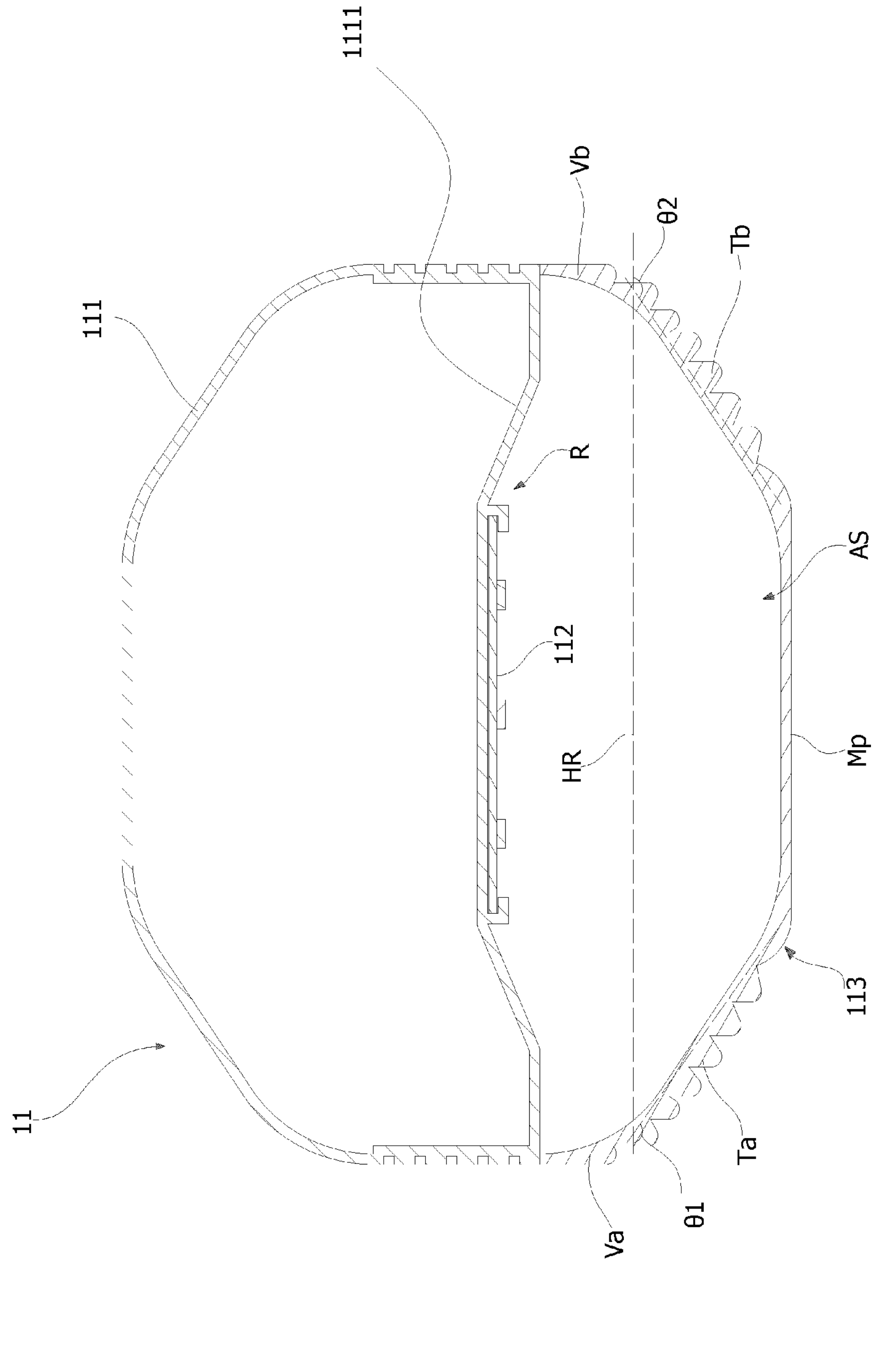
FIG. 6 is the sectional view of the light-emitting module of the lighting device having anti-glare light cover in accordance with one embodiment of the present invention.
Figure 7:
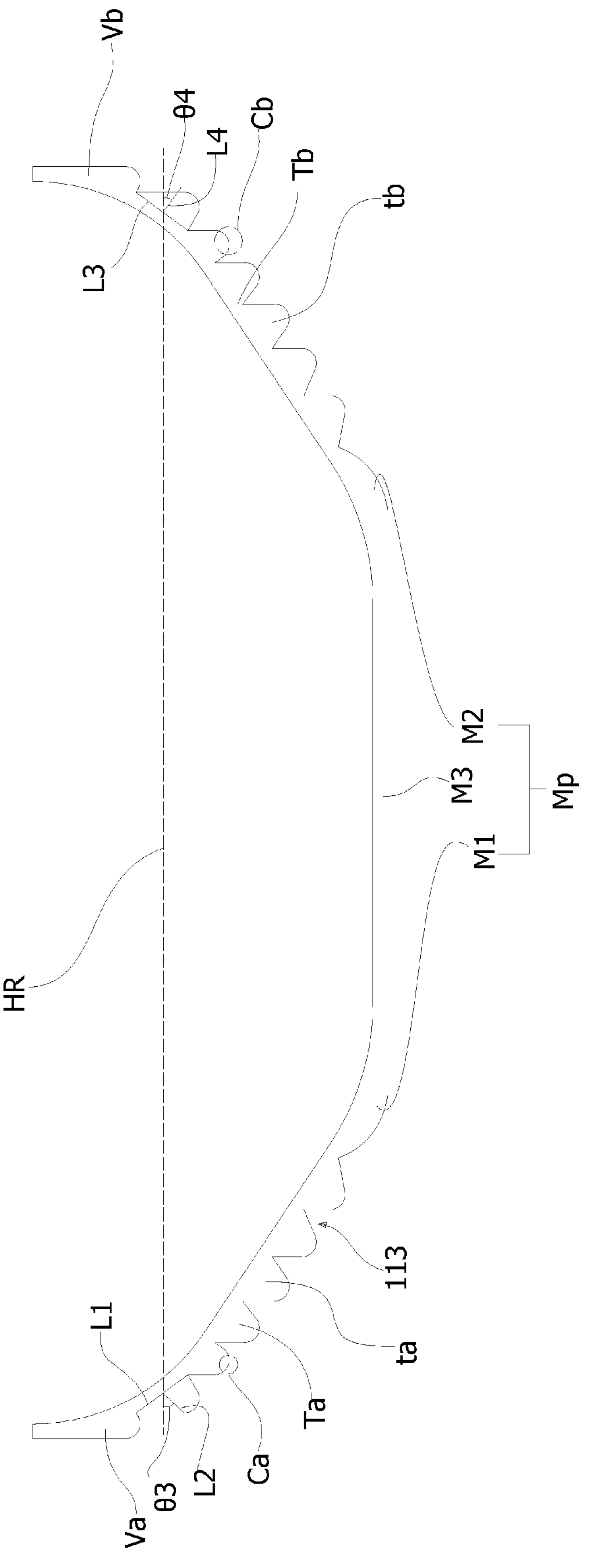
FIG. 7 is the schematic view of the light-emitting module of the lighting device having anti-glare light cover in accordance with one embodiment of the present invention.

Please refer to FIG. 6 and FIG. 6. FIG. 6 is the sectional view of the light-emitting module of the lighting device having anti-glare light cover in accordance with one embodiment of the present invention. FIG. 7 is the schematic view of the light-emitting module of the lighting device having anti-glare light cover in accordance with one embodiment of the present invention. As shown in FIG. 6 and FIG. 7, the light-emitting module 11 includes the main body 111, the light source board 112 and the light cover 113. The main body 111 has an installation portion 1111. The installation portion 1111 has a recess R. The light source board 112 is disposed on the installation portion 1111 and is inside the recess R. In the embodiment, the light-emitting module 11 may be an octagonal prism (the cross section of the light-emitting module 11 is octagonal). In another embodiment, the light-emitting module 11 may be a pentagonal prism (the cross section of the light-emitting module 11 is pentagonal) or a hexagonal prism (the cross section of the light-emitting module 11 is hexagonal). The shape of the light-emitting module 11 may be changed according to actual requirements.

The light cover 113 is disposed on the main body 111 to form an accommodating space AS between the main body 111 and the light cover 113. The light source board 112 is disposed in the accommodating space AS.

The light cover 113 includes a left vertical portion Va, a right vertical portion Vb, a left sawteeth portion Ta, a right sawteeth portion Tb and a central portion Mp. The left vertical portion Va and the right vertical portion Vb are connected to the main body 111. The left sawteeth portion Ta and the right sawteeth portion Tb are connected to the left vertical portion Va and the right vertical portion Vb respectively. The central portion Mp are connected to the left sawteeth portion Ta and the right sawteeth portion Tb. The left vertical portion Va and the right vertical portion Vb are perpendicular to a horizontal reference line HR.

There is an included angle θ1 between the left sawteeth portion Ta and the horizontal reference line HR. The left sawteeth portion Ta and the right sawteeth portion Tb are symmetric to each other. There is an included angle θ2 between the right sawteeth portion Tb and the horizontal reference line HR. The central portion Mp is parallel to the horizontal reference line HR.

In the embodiment, the left sawteeth portion Ta has a plurality of left sawteeth ta connected to each other. The included angles θ3 between the horizontal reference line HR and the normal lines L2 of the bottom sides L1 of the left sawteeth ta increase in the direction toward the central portion Mp. The top of each of the left sawteeth ta has a left sawtooth curved surface Ca. The radian measures corresponding to the left sawtooth curved surfaces Ca of the left sawteeth ta increase in the direction toward the central portion Mp.

The structure of the right sawteeth portion Tb is the same with that of the lift sawteeth portion Ta. The right sawteeth portion Tb has a plurality of right sawteeth tb connected to each other. The included angles θ4 between the horizontal reference line HR and the normal lines L4 of the bottom sides L3 of the right sawteeth tb increase in the direction toward the central portion Mp. Besides, the top of each of the right sawteeth tb has a right sawtooth curved surface Cb. The radian measures corresponding to the right sawtooth curved surfaces Cb of the right sawteeth tb increase in the direction toward the central portion Mp.

The above structure design can serve as a special and effective anti-glare structure. Via the above anti-glare structure, the included angle between the lighting range of the lighting device 1 and the ceiling (parallel to the horizontal reference plane HR) is greater than or equal to 30°. Therefore, the above anti-glare structure can effectively eliminate glare of the light emitted by the lighting device 1 and can increase the brightness of the lighting range of the t lighting device 1, so the user will not feel uncomfortable. Thus, the performance of the lighting device 1 can be greatly enhanced, so the lighting device 1 can be more comprehensive in application.

In the embodiment, the central portion Mp has a plane portion M3, a left curved portion M1 and a right curved portion M2. The plane portion M3 is disposed between the left curved portion M1 and the right curved portion M2. The radian measure of the left curved portion M1 is less than that of the left sawtooth curved surface Ca of any one of the left sawteeth ta. Similarly, the radian measure of the right curved portion M2 is less than that of the right sawtooth curved surface Cb of any one of the right sawteeth tb. Via the above special optical structure design, the light emitted by the lighting device 1 can be concentrated at a specific lighting range, and can be uniform and soft. As a result, the light emitted by the lighting device 1 can make the user feel more comfortable in order to meet the requirements of different applications.

The embodiment just exemplifies the present invention and is not intended to limit the scope of the present invention; any equivalent modification and variation according to the spirit of the present invention is to be also included within the scope of the following claims and their equivalents.

Figure 8:
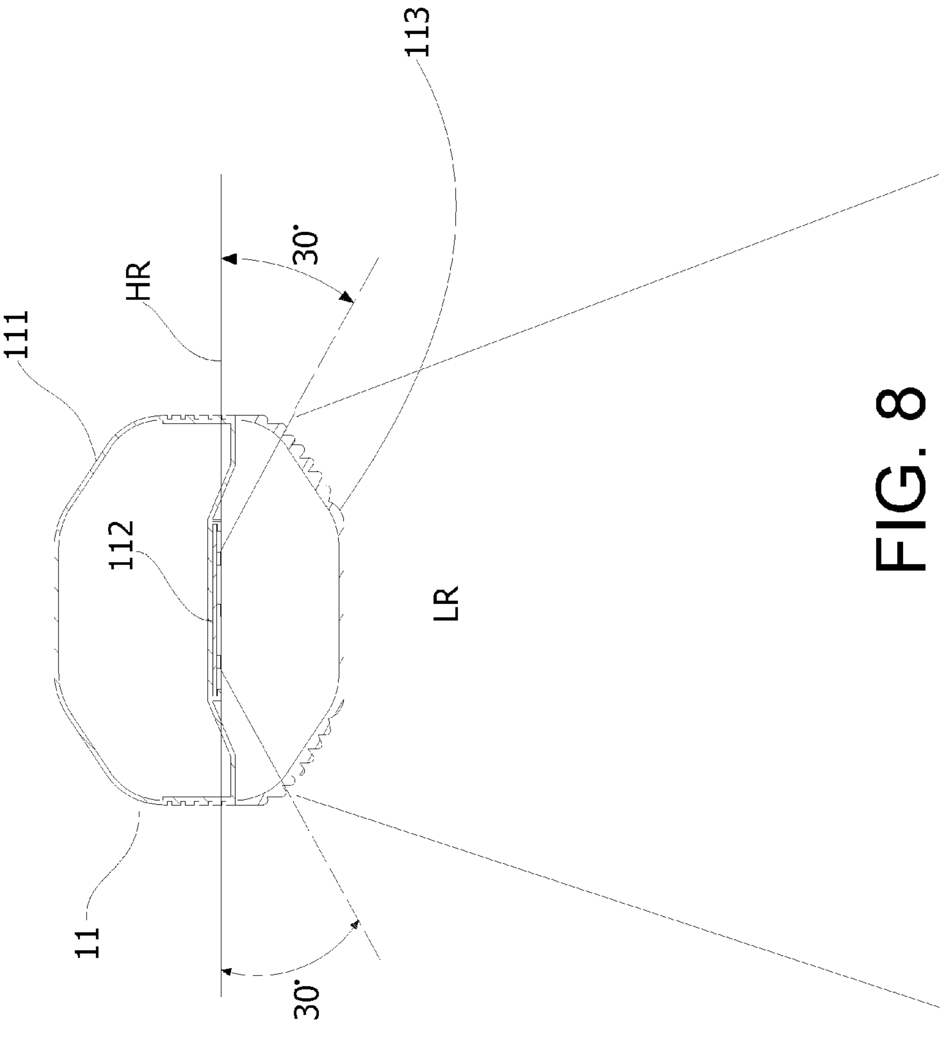
FIG. 8 is the schematic view of the lighting device having anti-glare light cover in accordance with one embodiment of the present invention.

Please refer to FIG. 8, which is the schematic view of the lighting device having anti-glare light cover in accordance with one embodiment of the present invention. Please also refer to FIG. 6 and FIG. 7. As shown in FIG. 8, the light cover 113 has the external sawteeth structure including the left sawteeth portion Ta and the right sawteeth portion Tb. The left sawteeth portion Ta and the right sawteeth portion Tb can provide great anti-glare effect. Thus, the included angle between the lighting range of the lighting device 1 and the ceiling (parallel to the horizontal reference plane HR) can be much greater than 30°. Therefore, the above anti-glare structure can effectively eliminate glare of the light emitted by the lighting device 1 and can increase the brightness of the lighting range of the lighting device 1, so the user will not feel uncomfortable. Meanwhile, the light emitted by the lighting device 1 can be concentrated at a specific lighting range LR, and can be uniform and soft. As a result, the performance of the lighting device 1 can be greatly enhanced, so the lighting device 1 can be more comprehensive in application.

The embodiment just exemplifies the present invention and is not intended to limit the scope of the present invention; any equivalent modification and variation according to the spirit of the present invention is to be also included within the scope of the following claims and their equivalents.

Figure 9:
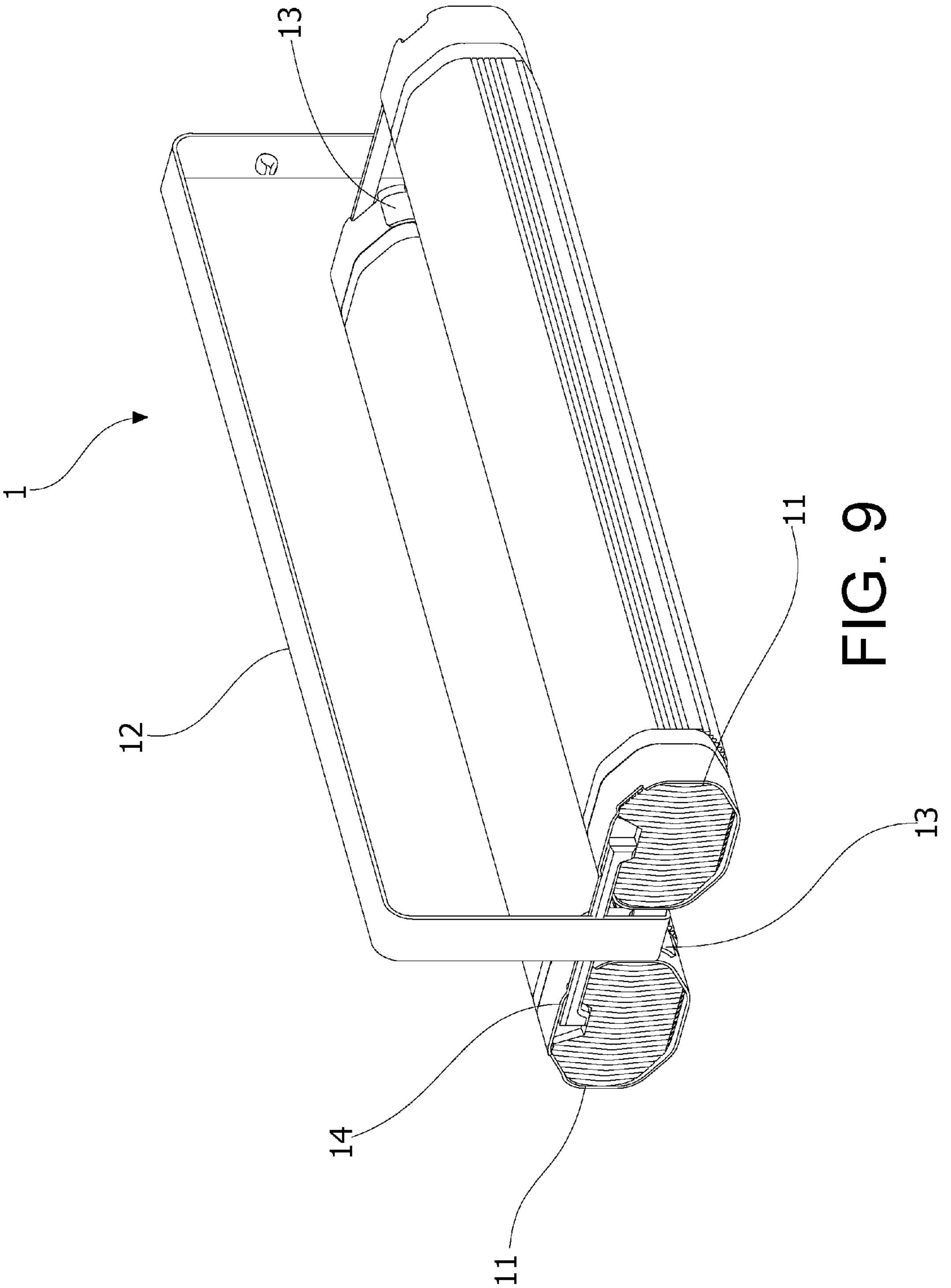
FIG. 9 is the perspective view of the lighting device having anti-glare light cover in accordance with another embodiment of the present invention.

Please refer to FIG. 9, which is the perspective view of the lighting device having anti-glare light cover in accordance with another embodiment of the present invention. As shown in FIG. 9, the lighting device 11 includes a plurality of light-emitting modules 11, a hanging frame 12, a plurality of connecting elements 13 and a plurality of connecting wires 14. The difference between the embodiment and the previous embodiment is that the lighting device 1 of the embodiment includes only two light-emitting modules 11. Thus, the number of the light-emitting modules 11 can be adjusted according to actual requirements.

The embodiment just exemplifies the present invention and is not intended to limit the scope of the present invention; any equivalent modification and variation according to the spirit of the present invention is to be also included within the scope of the following claims and their equivalents.

It is worthy to point out that the currently available lighting device cannot adjust the irradiation direction and lighting range thereof, so the only way to increase the brightness is to increasing the power. Thus, the currently available lighting device has serious light glare, which will make the user feel uncomfortable. For the reason, the application of the currently available lighting device is limited and cannot meet actual requirements. Besides, the power consumption of the currently available lighting device cannot be effectively reduced, so the currently available lighting device is not energy-saving, so cannot conform to the future development trend. On the contrary, according to one embodiment of the present invention, the light cover of the lighting device includes a left vertical portion, a right vertical portion, a left sawteeth portion, a right sawteeth portion and a central portion, which can form a special and effective anti-glare structure, such that the included angle between the lighting range of the lighting device and the ceiling (parallel to the horizontal reference plane) is greater than or equal to 30°. Accordingly, the above anti-glare structure can effectively eliminate glare of the light emitted by the lighting device and can increase the brightness of the lighting range of the lighting device, so the user will not feel uncomfortable. Thus, the performance of the lighting device can be greatly enhanced, so the lighting device can be more comprehensive in application.

According to one embodiment of the present invention, the light cover of the lighting device includes the left vertical portion, the right vertical portion, the left sawteeth portion, the right sawteeth portion and the central portion, which can form the special and effective anti-glare structure. This anti-glare structure can effectively eliminate glare of the light emitted by the lighting device and can increase the brightness of the lighting range of the lighting device. Therefore, the lighting device can be applicable to factories, mines or other similar working places, so the lighting device can meet actual requirements.

Also, according to one embodiment of the present invention, the light cover of the lighting device includes the left vertical portion, the right vertical portion, the left sawteeth portion, the right sawteeth portion and the central portion, which can form the special and effective anti-glare structure. This anti-glare structure can effectively increase the brightness of the lighting range of the lighting device. In this way, the power consumption of the lighting device can be effectively reduced, so the lighting device can save more energy. Thus, the lighting device can conform to the future development trend.

In addition, according to one embodiment of the present invention, the light cover of the lighting device includes the left vertical portion, the right vertical portion, the left sawteeth portion, the right sawteeth portion and the central portion. In addition, the central portion has a plane portion, a left curved portion and a right curved portion. Accordingly, the light cover of the lighting device has a special optical structure, which can make the light emitted by the lighting device be uniform and soft. As a result, the light emitted by the lighting device can make the user feel more comfortable in order to meet the requirements of different applications.

Further, according to one embodiment of the present invention, the light cover of the lighting device has the special optical structure design and the effective anti-glare structure, which can not only effectively eliminate glare of the light emitted by the lighting device, but also can prevent from light spot. Thus, the lighting device can provide a great user experience.

Moreover, according to one embodiment of the present invention, the lighting device has an irradiation direction adjustment mechanism, so the irradiation direction of the lighting device can be adjusted according to actual requirements. Therefore, the lighting device can be more convenient in use and more flexible in application.

Furthermore, according to one embodiment of the present invention, the design of the lighting device is simple, so the lighting device can achieve great technical effects without significantly increasing the cost thereof.

Figure 10:
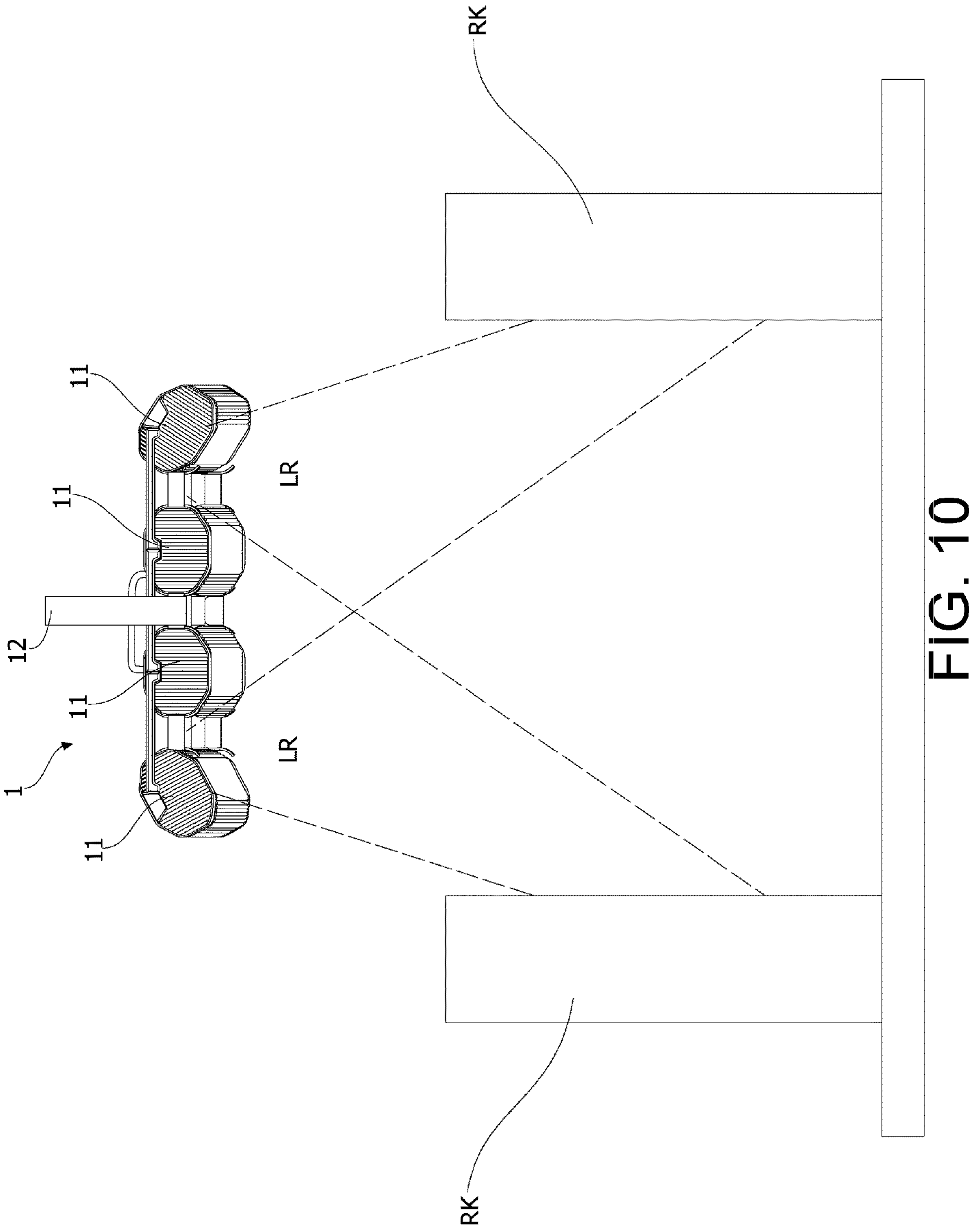
FIG. 10 is the first schematic view of the lighting device in operation in accordance with still another embodiment of the present invention.

Please refer to FIG. 10, which is the first schematic view of the lighting device in operation in accordance with still another embodiment of the present invention. The embodiment illustrates the situation of installing a lighting device 1 on the ceiling of a warehouse. As shown in FIG. 10, the lighting device 1 includes a plurality of light-emitting modules 11 and is fixed on the ceiling of the warehouse via the hanging frame 12. As described above, the radiation direction of each of the light-emitting modules 11 is adjustable. In the embodiment, the light-emitting module 11 at the left side and the light-emitting module 11 at the right side are slightly adjusted, such that the lighting range of the four light-emitting modules 11 can be concentrated at the area between the two shelves RK. The above anti-glare structure of the lighting device 1 can effectively eliminates glare of the light emitted by the lighting device and can increase the brightness of the lighting range of the lighting device 1, so the user will not feel uncomfortable. Thus, the performance of the lighting device 1 can be greatly enhanced, so the lighting device can be more comprehensive in application.

The embodiment just exemplifies the present invention and is not intended to limit the scope of the present invention; any equivalent modification and variation according to the spirit of the present invention is to be also included within the scope of the following claims and their equivalents.

Figure 11:
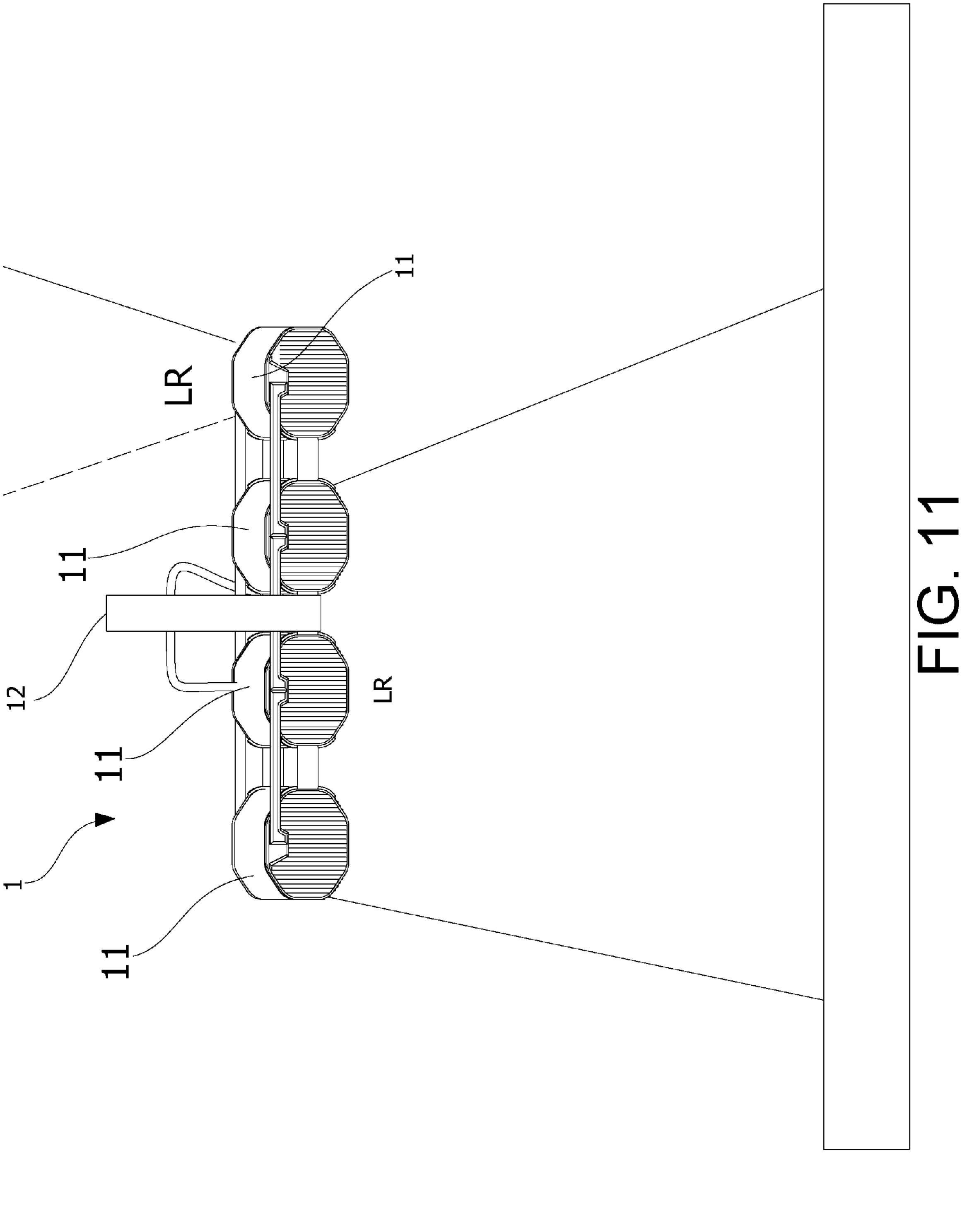
FIG. 11 is the second schematic view of the lighting device in operation in accordance with still another embodiment of the present invention.

Please refer to FIG. 11, which is the second schematic view of the lighting device in operation in accordance with still another embodiment of the present invention. The embodiment illustrates the situation of installing a lighting device 1 on the ceiling and a building and the ceiling is provided with a sunshade. As shown in FIG. 11, the lighting device 1 includes a plurality of light-emitting modules 11 and is fixed on the ceiling of the warehouse via the hanging frame 12. As described above, the radiation direction of each of the light-emitting modules 11 is adjustable. In the embodiment, the light-emitting module 11 at the right side is slightly adjusted, such that the sunshade is also in the lighting range of the light-emitting module 11.

The embodiment just exemplifies the present invention and is not intended to limit the scope of the present invention; any equivalent modification and variation according to the spirit of the present invention is to be also included within the scope of the following claims and their equivalents.

According to one embodiment of the present invention, the light cover of the lighting device includes a left vertical portion, a right vertical portion, a left sawteeth portion, a right sawteeth portion and a central portion, which can form a special and effective anti-glare structure, such that the included angle between the lighting range of the lighting device and the ceiling (parallel to the horizontal reference plane) is greater than or equal to 30°. Accordingly, the above anti-glare structure can effectively eliminate glare of the light emitted by the lighting device and can increase the brightness of the lighting range of the lighting device, so the user will not feel uncomfortable. Thus, the performance of the lighting device can be greatly enhanced, so the lighting device can be more comprehensive in application.

According to one embodiment of the present invention, the light cover of the lighting device includes the left vertical portion, the right vertical portion, the left sawteeth portion, the right sawteeth portion and the central portion, which can form the special and effective anti-glare structure. This anti-glare structure can effectively eliminate glare of the light emitted by the lighting device and can increase the brightness of the lighting range of the lighting device. Therefore, the lighting device can be applicable to factories, mines or other similar working places, so the lighting device can meet actual requirements.

Also, according to one embodiment of the present invention, the light cover of the lighting device includes the left vertical portion, the right vertical portion, the left sawteeth portion, the right sawteeth portion and the central portion, which can form the special and effective anti-glare structure. This anti-glare structure can effectively increase the brightness of the lighting range of the lighting device. In this way, the power consumption of the lighting device can be effectively reduced, so the lighting device can save more energy. Thus, the lighting device can conform to the future development trend.

In addition, according to one embodiment of the present invention, the light cover of the lighting device includes the left vertical portion, the right vertical portion, the left sawteeth portion, the right sawteeth portion and the central portion. In addition, the central portion has a plane portion, a left curved portion and a right curved portion. Accordingly, the light cover of the lighting device has a special optical structure, which can make the light emitted by the lighting device be uniform and soft. As a result, the light emitted by the lighting device can make the user feel more comfortable in order to meet the requirements of different applications.

Further, according to one embodiment of the present invention, the light cover of the lighting device has the special optical structure design and the effective anti-glare structure, which can not only effectively eliminate glare of the light emitted by the lighting device, but also can prevent from light spot. Thus, the lighting device can provide a great user experience.

Moreover, according to one embodiment of the present invention, the lighting device has an irradiation direction adjustment mechanism, so the irradiation direction of the lighting device can be adjusted according to actual requirements. Therefore, the lighting device can be more convenient in use and more flexible in application.

Furthermore, according to one embodiment of the present invention, the design of the lighting device is simple, so the lighting device can achieve great technical effects without significantly increasing the cost thereof.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device having anti-glare light cover comprising a plurality of light-emitting modules, wherein each of the light-emitting modules comprises:

a main body having an installation portion;

a light source board disposed on the installation portion; and a light cover disposed on the main body to form an accommodating space between the main body and the light cover, wherein the light source board is disposed in the accommodating space;

wherein the light cover comprises a left vertical portion, a right vertical portion, a left sawteeth portion, a right sawteeth portion and a central portion, wherein the left vertical portion and the right vertical portion are connected to the main body, and the left sawteeth portion and the right sawteeth portion are connected to the left vertical portion and the right vertical portion respectively, and the central portion are connected to the left sawteeth portion and the right sawteeth portion, wherein the left sawteeth portion has a plurality of left sawteeth connected to each other, and included angles between the horizontal reference line and normal lines of bottom sides of the left sawteeth increase in a direction toward the central portion, wherein the right sawteeth portion has a plurality of right sawteeth connected to each other, and included angles between the horizontal reference line and normal lines of bottom sides of the right sawteeth increase in the direction toward the central portion.

2. The lighting device having anti-glare light cover as claimed in claim 1, wherein the left vertical portion and the right vertical portion are perpendicular to the horizontal reference line parallel to the central portion, wherein there is an included angle between the left sawteeth portion and the horizontal reference line, and there is another included angle between the right sawteeth portion and the horizontal reference line.

3. The lighting device having anti-glare light cover as claimed in claim 1, wherein a top of each of the left sawteeth has a left sawtooth curved surface, and radian measures corresponding to the left sawtooth curved surfaces of the left sawteeth increase in the direction toward the central portion.

4. The lighting device having anti-glare light cover as claimed in claim 1, wherein a top of each of the right sawteeth has a right sawtooth curved surface, and radian measures corresponding to the right sawtooth curved surfaces of the right sawteeth increase in the direction toward the central portion.

5. The lighting device having anti-glare light cover as claimed in claim 1, wherein the central portion has a plane portion, a left curved portion and a right curved portion, and the plane portion is disposed between the left curved portion and the right curved portion.

6. The lighting device having anti-glare light cover as claimed in claim 1, wherein the installation portion has a recess and the light source board is disposed in the recess.

* * * * *